United States Patent Office 3,732,231
Patented May 8, 1973

3,732,231
D-6-METHYL-8-CYANO METHYLERGOLINE (I)
AND METHOD OF MAKING THE SAME
Miroslav Semonsky and Norbert Kucharczyk, Prague, Czechoslovakia, assignors to Spofa, United Pharmaceutical Works, Prague, Czechoslovakia
No Drawing. Continuation of abandoned application Ser. No. 713,297, Mar. 15, 1968. This application June 18, 1971, Ser. No. 154,672
Claims priority, application Czechoslovakia, Mar. 16, 1967, 1,920/67, 1,921/67, 1,922/67
Int. Cl. C07d 43/20
U.S. Cl. 260—285.5         1 Claim

ABSTRACT OF THE DISCLOSURE

D-6-methyl-8-cyano methylergoline having the formula

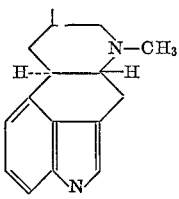

prepared by reacting D-6-methyl-8-hydroxymethylergoline (I) with phosphoryl chloride and thereafter reacting the D-6-methyl-8-chloromethylergoline formed with an alkali metal cyanide. The compounds of the invention constitute antifertility and lactation inhibiting agents.

CROSS REFERENCES TO RELATED APPLICATIONS

The application is a continuation of application Ser. No. 713,297 filed Mar. 15, 1968 and now abandoned.

The invention is concerned with derivatives of D-6-methylergoline(I) of the Formula I

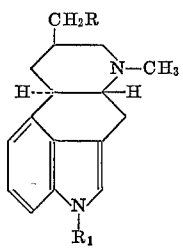

wherein R is chlorine, a group —CN, —COOH, —COCl, —COOCH$_3$, —CONHNH$_2$ or —CON$_3$, and R$_1$ is hydrogen, whereat in case that R is the group —COOH, R$_1$ may signify as well the group —CH$_3$, and to the method of making the same.

Said new substances containing in their molecule the cyclic part of the D-lysergic, resp. D-dihydrolysergic acid, constituting one of the fundamental building stones of the pharmacologically and therapeutically effective ergot alkaloids, being for themselves pharmacodynamically effective, and being able to serve as well for starting substances to the synthesis of further therapeutically valuable derivatives.

The compound D-6-methyl-8-cyanomethylergoline(I) has a high antifertility activity. In a dose of 1 to 2 mg./rat, administered to normal female rats the 5th or 7th day after fertilization, this compound inhibits the development of the fetus without any toxic effect. Acute toxicity (LD$_{50}$) after oral administration to rats is 130–170 mg./kg.

According to the invention the derivatives of D-6-methylergoline(I) of the Formula I are prepared in the way that D-6-methyl-8-hydroxymethylergoline(I) of the Formula II

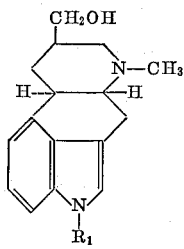

is converted to D-6-methyl-8-chloromethylergoline(I), and the latter to D-6-methyl-8-cyanomethylergoline(I), which in its turn is saponified to the D-6-methyl-8-ergolin(I)yl acetic acid, which contingently is methylated in the position 1, or converted to chloride-hydrochloride, and esterified to the methylester, which is converted to hydrazide, and the latter to the corresponding azide.

In carrying out the method according to the invention, the D-6-methyl-8-hydroxymethylergoline(I) can be converted to D-6-methyl-8-chloromethylergoline(I) by the action of phosphorus oxychloride, preferably at the reaction mixture boiling point temperature, in the atmosphere of a non-oxidizing gas, preferably nitrogen. As a rule an one hour boil of the starting compound with an about 70 fold weight excess of the chlorination agent, under exclusion of air humidity and of direct light may be sufficient. The D-6-methyl-8-chloromethylergoline(I) can be obtained as well, although in a sensibly lower yield, by means of the reaction of the compound of the Formula II with one mole-equivalent of phosphorus pentachloride, e.g. in the medium of acetonitrile, tetrahydrofurane or chloroform, contingently by simultaneous chlorination of a phosphorus trichloride and pentachloride mixture, e.g. in the medium of tetrahydrofurane.

The conversion of D-6-methyl-8-chloromethylergoline-(I) to D-6-methyl-8-cyanomethylergoline(I) can be effected by the action of sodium cyanide in the medium of dimethylsulfoxide, at a temperature of 80–140° C. Said reaction can be carried out to advantage with a larger cyanide surplus, and in the atmosphere of a non-oxidizing gas, under exclusion of direct light. The said cyanomethyl compound can also be obtained by reacting the starting compound in the medium of glycols, e.g. ethylene glycol, at an elevated temperature, although in a substantially lower yield. In the media of acetone, methanol, or pyridine the reaction either does not take place at all, or it takes place in a very restricted measure only, even when sodium iodide has been used for facilitating the reaction. The D-6-methyl-8-cyanomethylergoline(I) can also be obtained of the known O-tosylderivative of D-6-methyl-8-hydroxymethylergoline(I) by the reaction of an alkali metal cyanide, e.g. potassium cyanide, in the medium of dimethylsulfoxide, or of an aqueous dimethyl formamide. Neither the latter method is preferable, being more complex and giving lower yields.

The saponification of D-6-methyl-8-cyanomethylergoline(I) leading to D-6-methyl-8-ergolin(I)yl acetic acid can be effected best by the action of a surplus quantity of an aqueous-ethanolic potassium hydroxide solution, at the reaction mixture boiling point temperature, under exclusion of direct light, and in the atmosphere of a non-oxidizing gas, e.g. nitrogen. From the potassium salt the desired acid is liberated by means of a cautious acidification, e.g. by introduction of carbon dioxide into the aqueous solution of the salt.

The methylation of the latter acid to give the corresponding 1-methyl derivative is carried out preferably with methyl iodide in an amount of 1–25 mol-equivalents, in the medium of liquid ammonia, in the presence of an alkali metal amide, e.g. potassium amide, in an amount of 1–25 mol-equivalents, whereat the reaction course is facilitated by the addition of a slight amount of ferric nitrate. The reaction product is isolated by evaporation of the ammonia, and by purification of the evaporation residue by dissolving it in aqueous ammonia, and precipitation with acetic acid.

The chloride-hydrochloride of D-6-methyl-8-ergolin(I)-yl acetic acid is prepared preferably by subjecting the D-6-methyl-8-ergolin(I)yl acetic acid to the action of a phosphorus pentachloride and trichloride mixture, in the medium of tetrahydrofurane and chloroform, at a temperature of 0–5° C. The chloride-hydrochloride thus formed is eliminated from the reaction mixture by addition of a solvent in which it is practically insoluble, e.g. hexane. It is advisable to suck off the product in the nitrogen atmosphere, under exclusion of air humidity, and after having it washed, e.g. with hexane again, to remove the residues of volatile products by drying in an evacuated exsiccator. The crude product, capable of being applied to the further work, is obtained in a yield of 90–95%; it contains about 60% of the desired substance.

To the conversion of the D-6-methyl-8-ergolin(I)yl acetic acid to the methylester thereof, diazomethane can be applied to advantage, in an amount of at least one mol-equivalent, in the medium of an inert solvent, e.g. ether or benzene, at a temperature of 10–25° C., under exclusion of direct light. Said methylester can be obtained as well by means of methanolysis of the D-6-methyl-8-cyanomethylergoline(I) by the action of an unhydrous hydrogen chloride solution in anhydrous methanol, and by the subsequent short warming the solution of the reaction product with sodium bicarbonate, although in a low yield.

In a further operational stage the D-6-methyl-8-ergolin-(I)yl acetic acid methylester is converted to the corresponding hydrazide by heating the former with hydrazine hydrate to the reaction mixture boiling point temperature. In this case it may be serviceable to use a considerable excess of hydrazine hydrate, and to operate in a nitrogen atmosphere.

The conversion of D-6-methyl-8-ergolin(I)yl acetic acid hydrazide to the azide, respectively, to azide hydrochloride, can be effected by the action of one mol-equivalent of nitrous acid upon the hydrazide hydrochloride aqueous solution, at a temperature of 0–5° C. The azide desired can be isolated serviceably from the reaction mixture in the form of the hydrochloride, which is eliminated in crystalline form by addition of hydrochloric acid. The azide base, which for itself is rather unstable, can be obtained of the latter salt by liberation by means of alkalization, e.g. with sodium bicarbonate, or with an organic non-reactive base, such as triethylamine.

Preparation of the new D-6-methyl-8-ergoline(I) derivatives by the method according to the invention is not connected with any changement of the steric configuration on the centers of assymetry present in the molecule, the evidence of which is given e.g. by the fact that D-6-methyl-8-ergolin(I)yl acetic acid azide gave by degradation according to Curtius the known D-6-methyl-8-aminomethylergoline(I) falling under the same steric series as the starting D-6-methyl-8-hydroxymethylergoline(I).

Example I.—D-6-methyl-8-chloromethylergoline(I)

15 g. of D-6-methyl-8-hydroxymethylergoline(I) has been boiled for 1 hour under reflux and under exclusion of air moisture, in nitrogen atmosphere, together with 1000 ml. of freshly redistilled phosphorus oxychloride. Thereupon the volatile portion has been distilled off at a pressure of 8 torr, the evaporation residue has been poured over with 200 ml. of water under external cooling, and thereupon with 500 ml. of a saturated aqueous sodium bicarbonate solution, and the mixture was heated for 30 minutes to 80–90° C. After 16 hours standing of the mixture at 18° C. the substance eliminated was sucked off, washed with water, and dried at 50° C./0.5 torr.

There have been obtained 16 g. of a product, which on dissolution in 2000 ml. of anhydrous chloroform free of hydrogen chloride, and filtering off the undissolved portion, has been chromatographed on a column of 120 g. silicagel. By elution with chloroform containing 1% of ethanol there were obtained 8.5 g. (53%) of a pure product. The sample resublimed at 200° C./0.2 torr showed M.P. 250–252° C. (decomp.), $[\alpha]_D^{20} = -92.5°$ (c.=0.4, pyridine).

Example II.—D-6-methyl-8-cyanomethylergoline(I)

A mixture of 8.5 g. of D-6-methyl-8-chloromethylergoline(I), 8 g. of sodium cyanide and 200 ml. of dimethylsulfoxide has been heated in nitrogen atmosphere for 3 hours to 120° C., and after 12 hours standing at room temperature the reaction mixture has been poured into 800 ml. of water. The substance eliminated has been sucked off after 30 min. standing, and heated for 15 minutes to 60° C. with 500 ml. of water. After having been cooled down to the room temperature the product was sucked off and dried at 80° C./10 torr. There have been obtained 7.8 g. (95%) of an almost colourless product with M.P. 282–285° C. (decomp.). A sample of the substance resublimed at 200° C./0.1 torr showed M.P. 285–287° C. (decomp.), $[\alpha]_D^{20} = -102°$ (c.=0.4, pyridine).

Example III.—D-6-methyl-8-ergolin(I)yl acetic acid

A mixture of 7.0 g. of D-6-methyl-8-cyanomethylergoline(I) with a solution of 35 g. potassium hydroxide in 210 ml. ethanol and 70 ml. water has been boiled for 20 hours under reflux in nitrogen atmosphere, thereupon diluted with 210 ml. ethanol, and left to stand overnight at 0° C. The potassium salt of the acid eliminated has been sucked off and washed with ethanol. The yield was 7.2 g., i.e. 86%. Thereupon the salt was dissolved in 120 ml. water, and from the filtrate the D-6-methyl-8-ergolin(I)yl acetic acid was liberated with carbon dioxide. After having cooled the mixture to 0° C. the acid was sucked off, washed with water and dried at 85° C./10 torr. The yield of the first portion was 4.6 g., and the further portion of 0.6 g. was obtained of the mother liquors in the same manner, making altogether 5.2 g. (70%). An analytical sample (crystallized from water) melts above 360° C. (decomp.), $[\alpha]_D^{20} = -62.5°$ (c.=0.4, 0.1 N NaOH).

Example IV.—D-1,6-dimethyl-8-ergolin(I)yl actic acid

Into 200 ml. of anhydrous liquid ammonia 2.0 g. of potassium and after 15 min. 250 mg. of triturated ferric nitrate monohydrate and 1.0 g. of triturated D-6-methyl-8-ergolin(I)yl acetic acid and after further 30 min. 11.4 g. of methyl iodide have been added with stirring in portions, in nitrogen atmosphere. The reaction mixture was stirred forth for 1 hour at a temperature of −60° to −70° C. The residue on evaporation of the ammonia has been digested with 20 ml. of a 25% aqueous ammonia. The undissolved portion was filtered off, and by acidifying the filtrate with acetic acid to a pH 5–6, the D-1,6-dimethyl-8-ergolin(I)yl acetic acid was eliminated in a yield of 1.05 g., which has been purified by reprecipitation with acetic acid from the ammoniacal solution. It forms yellowish needles, melting by warming above 360° C. (decomp.), $[\alpha]_D^{20} = -67.5°$ C. (c.=0.4, 0.1 N NaOH).

Example V.—D-6-methyl-8-ergolin(I)yl acetic acid chloride-hydrochloride

Into a mixture of 2.9 ml. tetrahydrofurane, 3.5 ml. chloroform and 0.9 ml. phosphorus trichloride, cooled down to 0° C., 500 mg. of rubbed up anhydrous D-6-methyl-8-ergolin(I)yl acetic acid have been introduced under exclusion of air moisture, and thereupon a solution of 500 mg. of freshly resublimed phosphorus pentachloride in 15 ml. of phosphorus trichloride were added with stirring at 0–5° C., and the mixture was stirred forth for additional 3 hours at the said temperature. On addition of 20 ml. n-hexane and stirring up the acid chloride-hydrochloride thus eliminated has been sucked off in nitrogen atmosphere, washed with n-hexane, and dried at 25° C./10 torr. The yield was 560 mg. (94%) of a product of about a 60% content.

Example VI.—D-6-methyl-8-ergolin(I)yl acetic acid methylester

A mixture of 280 mg. of diazomethane in 22 ml. ether and 6 ml. of methanol and 280 mg. of D-6-methyl-8-ergolin(I)yl acetic acid was left to stand with intermittened stirring up for 48 hours at room temperature. The filtrate was then evaporated and the residue of the crude product dissolved in 5 ml. benzene, and the solution while hot was diluted with 5 ml. of n-hexane. The product eliminated by cooling down was sucked off and dried at 40° C./10 torr. The yield was 220 mg., i.e. 75%. A sample of the substance, resublimed at 180° C./0.1 torr showed M.P. 196–198° C., $[\alpha]_D^{20} = -92.5°$ (c.=0.4, pyridine).

Example VII.—D-6-methyl-8-ergolin(I)yl acetic acid hydrazide

A mixture of 240 mg. of D-6-methyl-8-ergolin(I)yl acetic acid methylester and of 5 ml. hydrazine hydrate was heated to the boil for 2 hours under reflux, in nitrogen atmosphere. On dilution of the mixture cooled down with 5 ml. water, and cooling forth to 0° C. the hydrazide eliminated was sucked off, washed with water and dried at 90° C./10 torr. The yield was 200 mg. (83%). On crystallization of a methanol-benzene-n-hexane mixture the substance showed M.P. 240–245° C. (decomp.), $[\alpha]_D^{20} = -82.5°$ (c.=0.29, pyridine).

Example VIII.—D-6-methyl-8-ergolin(I)yl acetic acid azide 150 mg. of D-6-methyl-8-ergolin(I)yl acetic acid hydrazide have been dissolved in 6.5 ml. of a 0.2 N HCl, and to the solution 0.5 ml. of a N NaNO$_2$ solution added at the temperature of 0° C. After 5 min. standing of the reaction mixture at the same temperature, and on acidifying same with 0.2 N HCl to a pH of 1–2, the crystalline hydrochloride of the desired azide thus eliminated has been sucked off, washed with 0.2 N HCl, and dried over anhydrous calcium chloride in an evacuated exsiccator. The yield amounted to 170 mg., i.e. 98.5%.

We claim:
1. D - 6 - methyl-8-cyanomethylergoline(I) having the formula

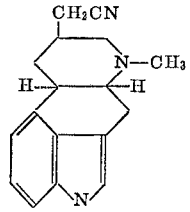

References Cited

UNITED STATES PATENTS 3,226,389   12/1965   Hertler _____ 260—283

FOREIGN PATENTS 1,439,953   4/1966   France _____ 260—285.5
1,199,233   7/1970   Great Britain _____ 260—285.5

OTHER REFERENCES

Testimony of Dr. Philip Lee, Hearings on H. Res. 1101, 90th Cong., 2d Sess. (1968), p. 16.

DONALD G. DAUS, Primary Examiner

U.S. Cl. X.R.

424—261